US012769519B2

(12) United States Patent
Schiffman

(10) Patent No.: US 12,769,519 B2
(45) Date of Patent: Oct. 20, 2026

(54) GENERATING CROSS-PLATFORM APPLICATIONS

(71) Applicant: Alex Schiffman, Allentown, PA (US)

(72) Inventor: Alex Schiffman, Allentown, PA (US)

(73) Assignee: Alex Schiffman, Allentown, PA (US)

( * ) Notice: Subject to any disclaimer, the term of this patent is extended or adjusted under 35 U.S.C. 154(b) by 0 days.

(21) Appl. No.: 18/424,642

(22) Filed: Jan. 26, 2024

(65) Prior Publication Data

US 2025/0244958 A1 Jul. 31, 2025

(51) Int. Cl.
*G06F 8/41* (2018.01)
*G06F 8/33* (2018.01)

(52) U.S. Cl.
CPC ................ *G06F 8/33* (2013.01); *G06F 8/447* (2013.01)

(58) Field of Classification Search
None
See application file for complete search history.

(56) References Cited

U.S. PATENT DOCUMENTS

| | | | | |
|---|---|---|---|---|
| 5,675,801 A * | 10/1997 | Lindsey | G06F 8/30 | 717/108 |
| 5,875,331 A * | 2/1999 | Lindsey | G06F 8/30 | 717/165 |
| 6,968,541 B1 * | 11/2005 | Hanson | G06F 8/41 | 717/136 |
| 7,437,704 B2 | 10/2008 | Dahne-Steuber | | |
| 7,493,604 B2 * | 2/2009 | Mariani | G06F 9/45516 | 717/160 |
| 7,802,238 B2 * | 9/2010 | Clinton | G05B 23/0213 | 717/136 |
| 8,082,322 B1 * | 12/2011 | Pascarella | G06F 9/541 | 709/219 |
| 8,365,088 B1 | 1/2013 | Rodriguez | | |

(Continued)

FOREIGN PATENT DOCUMENTS

| | | |
|---|---|---|
| AU | 2021204770 | 8/2023 |
| CN | 104391730 | 3/2015 |

(Continued)

OTHER PUBLICATIONS

Cython.org [online], “Cython: C-Extensions for Python,” retrieved on Mar. 3, 2024, retrieved from URL<https://cython.org/>, 3 pages.

(Continued)

*Primary Examiner* — Jason D Mitchell
(74) *Attorney, Agent, or Firm* — Fish & Richardson P.C.

(57) ABSTRACT

Methods, systems, and apparatus, including computer programs encoded on computer storage media, for generating cross-platform applications. One of the methods includes receiving a request to generate one or more applications configured to perform one or more algorithms, wherein each of the one or more applications is configured to perform the one or more algorithms on a respective corresponding platform of a plurality of platforms; obtaining input data that represents user code that comprises the one or more algorithms; and processing at least a set of target language code derived from the input data to generate, for each of the respective corresponding platforms, a respective buildable application.

22 Claims, 7 Drawing Sheets

(56) References Cited

U.S. PATENT DOCUMENTS

| | | | | |
|---|---|---|---|---|
| 8,745,579 | B2 * | 6/2014 | Johnson, Jr. | G06F 8/38 717/106 |
| 9,239,710 | B2 | 1/2016 | Araya et al. | |
| 9,448,776 | B1 | 9/2016 | Sankaran et al. | |
| 10,061,573 | B2 | 8/2018 | Araya | |
| 10,133,558 | B2 | 11/2018 | Farooqi | |
| 10,437,564 | B1 | 10/2019 | Periwal | |
| 10,691,435 | B1 * | 6/2020 | Koryakin | G06F 8/52 |
| 10,789,509 | B2 | 9/2020 | Chan | |
| 11,082,481 | B2 | 8/2021 | Chiussi et al. | |
| 11,375,004 | B2 | 6/2022 | Chiussi et al. | |
| 11,789,704 | B2 * | 10/2023 | Konuri | G06F 8/447 717/106 |
| 2002/0194181 | A1 * | 12/2002 | Wachtel | G06F 16/972 |
| 2006/0225033 | A1 * | 10/2006 | Ye | G06F 8/52 717/106 |
| 2009/0249296 | A1 * | 10/2009 | Haenel | G06F 8/71 717/120 |
| 2010/0146492 | A1 * | 6/2010 | Shacham | G06F 8/76 717/137 |
| 2011/0088011 | A1 * | 4/2011 | Ouali | G06F 11/36 717/105 |
| 2011/0131548 | A1 * | 6/2011 | Colton | G06F 8/52 717/146 |
| 2012/0204159 | A1 * | 8/2012 | Ben-Artzi | G06F 8/51 717/137 |
| 2013/0167112 | A1 * | 6/2013 | Bostian | G06F 8/47 717/106 |
| 2013/0230845 | A1 * | 9/2013 | Egan | G01N 33/558 435/7.1 |
| 2013/0283232 | A1 * | 10/2013 | Van Megchelen | G06F 8/41 717/106 |
| 2013/0332818 | A1 * | 12/2013 | Speek | G06F 40/00 715/234 |
| 2014/0047423 | A1 | 2/2014 | Pizlo et al. | |
| 2014/0215446 | A1 | 7/2014 | Araya | |
| 2014/0282444 | A1 | 9/2014 | Araya | |
| 2015/0128106 | A1 * | 5/2015 | Halley | G06F 8/41 717/106 |
| 2015/0205603 | A1 | 7/2015 | Araya et al. | |
| 2016/0054983 | A1 | 2/2016 | Balasubramanian et al. | |
| 2017/0357489 | A1 | 12/2017 | Fleurimond | |
| 2018/0088937 | A1 | 3/2018 | Tamir et al. | |
| 2018/0349103 | A1 | 12/2018 | Brown et al. | |
| 2019/0278569 | A1 | 9/2019 | Horton | |
| 2020/0012500 | A1 | 1/2020 | Kern et al. | |
| 2020/0249936 | A1 | 8/2020 | Barfield, Jr. | |
| 2020/0272458 | A1 | 8/2020 | Guan et al. | |
| 2020/0285454 | A1 | 9/2020 | Antonevich | |
| 2020/0341754 | A1 * | 10/2020 | Kunjuramanpillai | G06F 8/77 |
| 2020/0401648 | A1 | 12/2020 | Kol et al. | |
| 2021/0011694 | A1 | 1/2021 | Ni et al. | |
| 2021/0096832 | A1 | 4/2021 | Rich et al. | |
| 2021/0216905 | A1 | 7/2021 | Floratou et al. | |
| 2021/0349865 | A1 * | 11/2021 | Shah | G06Q 30/0283 |
| 2021/0398015 | A1 | 12/2021 | Fogal et al. | |
| 2022/0147874 | A1 | 5/2022 | Thakore et al. | |
| 2022/0317979 | A1 | 10/2022 | Araujo Soares | |
| 2022/0360504 | A1 * | 11/2022 | Kairali | H04M 15/44 |
| 2023/0205495 | A1 * | 6/2023 | Jain | G06F 3/167 717/106 |
| 2023/0315416 | A1 * | 10/2023 | Wu | G06F 8/51 717/137 |
| 2023/0325164 | A1 | 10/2023 | Singh et al. | |
| 2024/0134666 | A1 | 4/2024 | Jaeger et al. | |
| 2025/0244959 | A1 | 7/2025 | Schiffman | |

FOREIGN PATENT DOCUMENTS

| | | |
|---|---|---|
| CN | 113535184 | 10/2021 |
| CN | 108595184 | 2/2022 |
| WO | WO 2021/136365 | 7/2021 |
| WO | WO 2023/114635 | 6/2023 |

OTHER PUBLICATIONS

Flutter.dev [online], “Flutter-Build apps for any screen,” retrieved on Mar. 26, 2024, retrieved from URL<https://flutter.dev/>, 9 pages.

Github.com [online], “Konchunas/PYRS: Python to Rust Transpiler,” available No. later than Sep. 28, 2023, retrieved on Mar. 27, 2024, retrieved from URL<https://github.com/konchunas/pyrs>, 6 pages.

Github.com [online], “Py2many: Python to many CLike languages transpiler,” retrieved on Mar. 3, 2024, retrieved from URL<https://github.com/py2many/py2many>, 5 pages.

Microsoft.com [online], “Xamarin: Free. Cross-platform. Open source. An app platform for building Android and iOS apps with .NET and C#.,” retrieved on Mar. 26, 2024, retrieved from URL <https://dotnet.microsoft.com/en-us/apps/xamarin>, 1 page.

Nuitka.net [online], “Nuitka the Python Compiler,” retrieved on Mar. 3, 2024, retrieved from URL<https://nuitka.net/>, 1 page.

Opencv.org [online], “OpenCV- Open Computer Vision Library,” retrieved on Mar. 26, 2024, retrieved from URL <https://opencv.org/>, 7 pages.

Pytorch.org [online], “PyTorch: New Announcements, ” retrieved on Mar. 26, 2024, retrieved from URL<https://pytorch.org/>, 1 page.

Reactnative.dev [online], “ React Native: Learn once, write anywhere,” retrieved on Mar. 26, 2024, retrieved from URL<https://reactnative.dev/>, 9 pages.

Tensorflow.org/lite [online], “TensorFlow Lite | ML for Mobile and EDGE devices,” retrieved on Mar. 26, 2024, retrieved from URL <https://www.tensorflow.org/lite>, 8 pages.

International Search Report and Written Opinion in International Appln. No. PCT/US2025/013014, mailed Mar. 12, 2025, 10 pages.

Chen et al., “Tree-to-tree Neural Networks for Program Translation,” Paper, 32nd Conference on Neural Information Processing Systems (NIPS, 2018), Montreal, Canada, 2018, 11 pages.

Fan et al., “CoVSCode: A Novel Real-Time Collaborative Programming Environment for Lightweight IDE,” Applied Sciences, 2019, 1-25.

Feng et al., “Attempts on using syntax trees to improve programming language translation quality by machine learning,” Paper, Graduate School of Information Science and Technology, The University of Tokyo, 2021, 1-8.

Salih et al., “High-level programming languages translator,” Paper, Master Thesis Computer Science, Thesis No. MCS-2008-17, Department of Interaction and System Design School of Engineering, Blekinge Institute of Technology, Sweden, Jan. 2008, 1-113.

* cited by examiner

GENERATING CROSS-PLATFORM APPLICATIONS

BACKGROUND

This specification relates to generating cross-platform applications.

Cross-platform applications perform similar functionalities across different platforms, or devices and operating systems, such as a desktop computer or a mobile device. A cross-platform application may require different files or be written in different coding languages for each platform. The cross-platform application may perform algorithms such as computer vision algorithms and machine learning algorithms.

SUMMARY

This specification describes how a system can generate cross-platform applications. For example, the system can receive a request to generate one or more applications configured to perform one or more algorithms. Each of the applications can be configured to perform the algorithms on a particular corresponding platform. The system can receive input data that includes user code that includes the algorithms. The system can process a set of target language code derived from the input data to generate, for each of the particular corresponding platforms, a buildable application for the particular corresponding platform. Thus, a single set of input data can be used to generate multiple buildable applications where each buildable application corresponds to particular platforms or device types. The target language code and the input data are described in detail below.

This specification also describes how a system can generate a set of target language code from a set of source language code. For example, the system can obtain input data that represents a set of source language code that, when executed, performs one or more algorithms. The system can process the input data to generate a set of target language code that, when executed, performs the one or more algorithms. Thus, the input data used to generate multiple buildable applications can be written in any of a variety of programming languages.

Particular embodiments of the subject matter described in this specification can be implemented so as to realize one or more of the following advantages.

The techniques described in this specification can generate applications for multiple different platforms given one set of user code. Each application for a particular platform may require a corresponding buildable application that includes different files, file structures, libraries, and coding languages. Developing applications for multiple platforms may thus be time-consuming and computing resource-intensive, and require user input and technical expertise in user interfaces and/or machine level code. The system described in this specification receives user code as input. The user code can be written in a high-level programming language, for example, that is commonly used for writing algorithms. The system can generate the different files necessary for a buildable application configured to execute the algorithms for each of multiple platforms, without any further input or expertise from the user. The system can thus allow a user to quickly and efficiently generate buildable applications for multiple platforms, speeding up application prototyping, application development, and application releases.

The system described in this specification can generate applications that have lower latency and increased throughput for user interactions and data processing compared to conventional applications. For example, many applications include a server-side processing model, where the application running on a device contains only the user interface, and the primary functionality of the application is performed on the server. However, the server-side processing model can have high latency for user interactions, and cannot operate without an internet connection. For algorithms such as machine learning or computer vision, the server-side processing model may impede real-time video processing, since the video data may not be received and processed by the server in a sufficiently short amount of time for the user. The system described in this specification can generate applications that, when executed, perform the primary functionality on the device, which decreases latency and increases throughput.

Furthermore, by performing the primary functionality on the device, the system can save computing time and resources and reduce complexity. For example, rather than performing and scaling computationally expensive computations on a remote server, the system can generate applications that, when executed, perform the primary functionality on a device on which the application is run.

The system described in this specification can also generate applications that make use of processors designed for specific algorithms, such as processors designed to run neural networks, without any further input or expertise from the user. The system can thus generate more efficient and faster applications.

The system described in this specification can also provide for a convenient user experience. For example, given a set of user code and no further user input, the system can generate applications for different platforms. In some examples, the system can provide for further customization by the user. For example, the system can provide for features in an integrated development environment (IDE) such as a linter or the generation and presentation of suggestions that aid the user in the application development process.

The system described in this specification can also generate a set of target language code from a set of source language code. The system can thus allow the user to provide the user code in any of a variety of programming languages, allowing the user to write code in the language of their choosing.

In addition, in some implementations, the system can generate a set of target language code with performance benefits. For example, the system can generate a first syntax tree, an intermediate syntax tree, and a second syntax tree. The system can modify the intermediate syntax tree by identifying portions of the intermediate syntax tree that are similar to portions of a mapping. The system can modify the identified portions based on the mapping.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
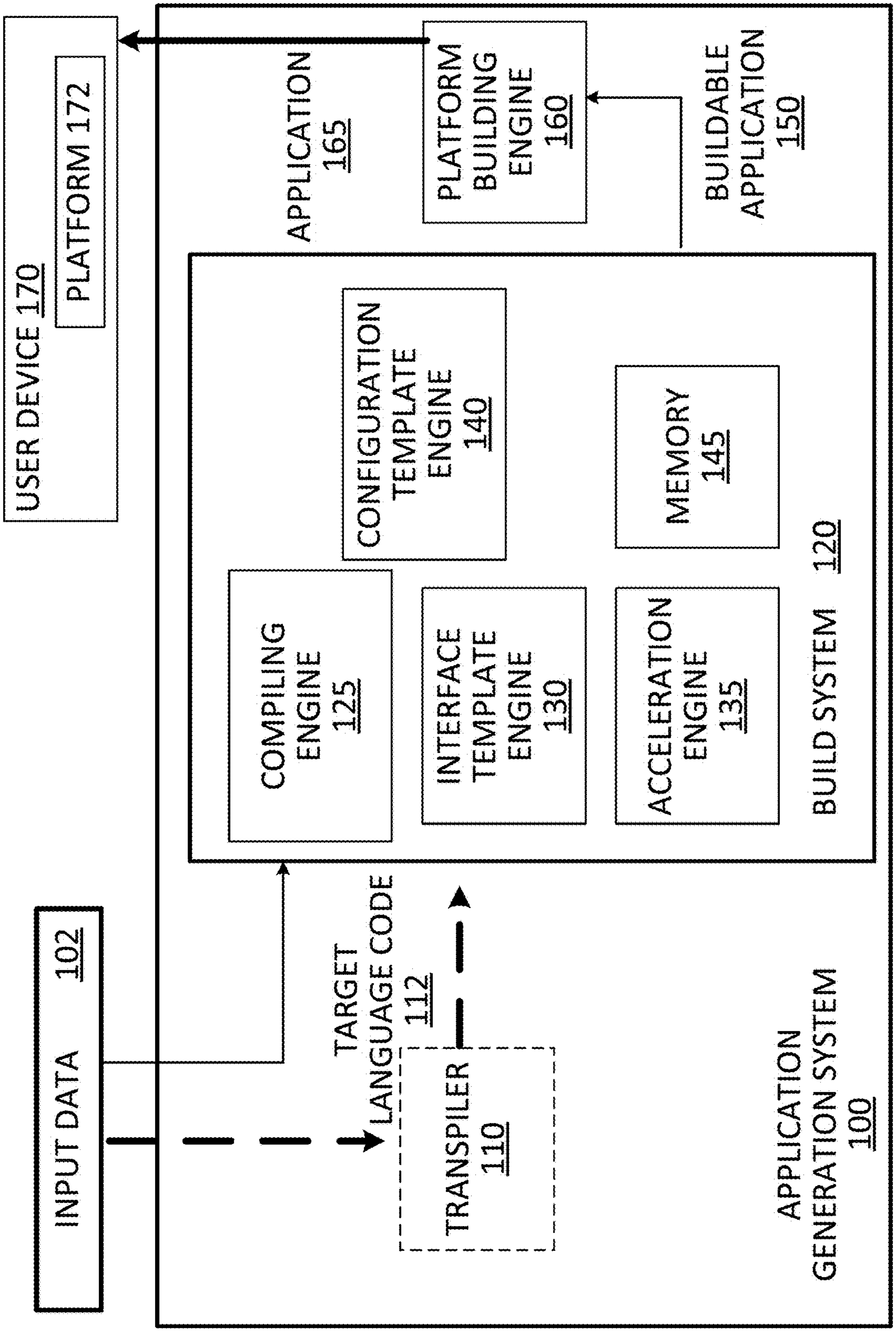
FIG. 1 is a diagram of an example system for generating cross-platform applications.

FIG. 1 is a diagram of an example application generation system 100 that is configured to generate cross-platform applications. The system 100 is an example of a system implemented as computer programs on one or more computers in one or more locations in which the systems, components, and techniques described below are implemented.

The system 100 includes various components, such as an optional transpiler 110, a build system 120, and a platform building engine 160. In some implementations, the transpiler 110, the build system 120, and the platform building engine 160 can be part of a same system and/or network of computing devices and/or systems.

The system 100 can receive a request to generate an application 165 for each of multiple platforms such as the platform 172 associated with a user device 170, e.g., based on a type of the user device or an operating system running on the user device. The system 100 can obtain input data 102 from a user that includes user code, and generate the application 165 as described below.

The system 100 can receive input data 102 to generate one or more applications configured to perform one or more algorithms. As used in this specification, an "algorithm" can include a sequence of steps for solving a logical or mathematical problem, or for performing a task such as performing a computation. For example, an algorithm can include machine learning algorithms for processing data and/or computer vision algorithms for processing image data. The input data 102 can represent user code that includes the one or more algorithms. In some examples, the input data 102 can also include data representing parameters and data representing an interface for the application.

In some implementations, the system 100 can receive user code in response to providing starter code to the user for ease of development. For example, the system 100 can provide starter code to the user. The starter code can include standard headers and/or structures. For example, the system 100 can provide a template code file in the source language code. In some examples, the system 100 can provide multiple template code files representing different types of applications or functionalities, and the system 100 can receive an input from the user indicating one of more of the template code files they would like to modify by adding user code.

The system 100 can derive a set of target language code 112 from the input data 102 for processing. In some examples, the user code can include a set of target language code 112.

In some examples, the user code can include a set of source language code. In these examples, the system can generate the set of target language code 112 from the source language code. For example, the system can use the transpiler 110 to generate a set of target language code from the source language code. Generating a set of target language code from the source language code is described in further detail below with reference to FIG. 6.

The system 100 can process the set of target language code 112 derived from the input data 102 using the build system 120 to generate a buildable application 150 for each of the platforms 172.

Each buildable application 150 can include multiple files, each associated with a corresponding directory. The build system 120 can generate the multiple files using components such as a compiling engine 125, interface template engine 130, acceleration engine 135, configuration template engine 140, and memory 145. The files can be organized into a structure that includes multiple layers, such as the interface layer, native layer, and algorithm layer described below with reference to FIG. 3.

The build system 120 can generate files such as configuration files, build files, object files, and code files. In some examples, the files can include code for application programming interfaces (APIs) for different layers of the application. The build system 120 can save data representing each file in the corresponding directory of the buildable application.

For example, the build system 120 can generate configuration files using the configuration template engine 140. The configuration template engine 140 can maintain multiple template configuration files. The template configuration files can be templates of configuration files, that the system can adapt to each application, for example, based at least on the set of target language code 112. The configuration template engine 140 can maintain the template configuration files in the memory 145, for example. The configuration template engine 140 can apply data derived from the input data 102 to one or more of the template configuration files. The configuration files can include files that various platforms and/or compilers require to build applications. For example, the configuration files can link various layers (e.g., frontend, native, and algorithm layers) of the application together, and link libraries. The configuration files can include, for example, interface configuration files, application configuration files, and/or platform configuration files. The configuration files can also include information about permissions, which are required to perform input and output functionalities such as camera input and/or file system input and output.

For example, the configuration template engine 140 can identify one or more template configuration files that are relevant to the input data 102. For example, the input data 102 may include user code that takes input from a camera. The configuration template engine 140 can identify template configuration files that include configuration information relevant to displaying the input from a camera on the application. The configuration template engine 140 can apply data derived from the input data, such as settings for the camera that may affect the display of the input from the camera, to the relevant template configuration files to generate configuration files.

The build system 120 can generate build files that include build code for the set of target language code 112. The build files can govern the compilation process for code written in the target language, such as the set of target language code 112 and linked libraries. The build system 120 can generate the build files using template build files stored in the memory 145, for example.

In some implementations, the build system 120 can generate build files that link only to libraries necessary to execute the algorithms of the input data 102, reducing the size of the buildable application 150 and the computing time for building the buildable application 150. For example, the build system 120 can map a library and the user code into a tree of dependencies. The build system 120 can determine a set of required components by traversing the tree of dependencies.

In some implementations, at least part of the tree of dependencies can be pre-computed and saved. In some implementations, the object files for common library dependencies can also be pre-compiled and saved.

The build system 120 can generate object files using the compiling engine 125 by compiling the set of target language code 112 according to the build files. The compiling engine 125 can include standard compilers for the target language. The object files can include machine code compiled from the set of target language code 112. The object files can include compiled binaries. For example, a compiled binary can represent a static library, a shared library, and/or an executable. For example, the files of the algorithm layer discussed below with reference to FIG. 3 can be compiled into static libraries, shared libraries, and/or executables.

The build system 120 can generate code files including interface code using the interface template engine 130 for a user interface of the buildable application 150. For example, the interface template engine 130 can maintain a mapping of subsets of source language code and target language code, e.g., that represent particular sensor modalities and/or data representations, to corresponding templates comprising interface code for user interface components of the buildable application 150. The interface template engine 130 can maintain the mapping, for example, in the memory 145. In some implementations, the interface code can be generated automatically from the templates.

In some implementations, the interface template engine 130 can generate interface code based on user input. For example, the system 100 can display multiple user interface components to the user through a user interface. The system 100 can receive an input from the user that identifies one or more of the displayed user interface components. The interface template engine 130 can generate interface code based on the corresponding templates for the identified user interface components.

The build system 120 can also generate code files that include debugging code, profiling code, platform code, and/or communication code.

For example, the build system 120 can modify the set of target language code 112 to include debugging code. For example, the debugging code, when executed, can printout or log the values of variables, array lengths, function calls, arguments, and information about crashes. The compiling engine 125 can then generate the object files by compiling the modified set of target language code that includes the debugging code.

As another example, the build system 120 can modify the set of target language code 112 to include performance profiling code. The compiling engine 125 can then generate the object files by compiling the modified set of target language code that includes the performance profiling code.

The platform code can implement platform functions for the platform 172, such as code implementing input and output functionalities. For example, the platform code can include code for the camera, other sensors, and file input and output. As an example, the build system 120 can generate a code file with platform code that implements camera features required to execute the user code.

The communication code can include code that implements one or more communication APIs. Each of the communication APIs can be used for communication between two layers, as described below with reference to FIG. 3.

In some implementations, the build system 120 can modify the set of target language code 112 using the acceleration engine 135. For example, the acceleration engine 135 can maintain a mapping of subsets of target language code to corresponding templates that each include target language code that is different from the subset of target language code and that, when executed, performs one or more operations of the subset of target language code. The acceleration engine 135 can identify one or more subsets within the target language code 112 that are similar to a subset of the mapping. In some implementations, the acceleration engine 135 can identify similar subsets using predefined rules, using a machine learning model that is configured to determine whether given subsets are similar, or using a clustering algorithm such as K-means.

The acceleration engine 135 can modify the one or more subsets within the target language code 112 based on the corresponding templates. In some examples, the corresponding templates can include target language code that, when executed, results in performance improvements over the subsets of target language code.

For example, the subsets and corresponding templates can include target language code for operations that include large amounts of array or matrix data, such as machine learning operations or computer vision operations. The corresponding templates can also include target language code selecting specific hardware or processors to perform specific operations on. In some examples, the target language code can select multiple heterogeneous processors for different operations of the algorithm. For example, the heterogeneous processors can include central processing units (CPUs), graphics processing units (GPUs), and/or neural processing units (NPUs).

In some implementations, the acceleration engine 135 can include corresponding templates specific to each type of user device 170 or each type of processor in each type of user device 170. In some implementations, the acceleration engine 135 can update the corresponding templates based on performance data collected by the build system 120. For example, the build system 120 can store performance data in the memory 145. The performance data can be recorded for different categories of operations of the target language code 112 for different processors and/or user devices. The categories can be determined based on the number and type of arithmetic operations, the presence and number of conditional operations, and/or the size of the inputs and outputs of the operations. The acceleration engine 135 can access the performance data and determine whether to update the corresponding templates. For example, the acceleration engine 135 can access the performance data and determine whether to update the corresponding templates at a predefined interval of time. As another example, the acceleration engine 135 can access the performance data and determine whether to update the corresponding templates in response to a trigger, such as the build system 120 receiving a set of target language code 112.

The system 100 can generate the application 165 by building the buildable application 150 using the platform building engine 160. The platform building engine 160 can be a platform-specific build system that can include one or more compilers. The platform building engine 160 can be one of multiple platform building engines, for example, that each correspond to a particular platform.

The system 100 can output the application 165 to be run on the platform 172 on the user device 170. The system 100 can output multiple applications 165 to be run on different platforms such as the platform 172.

Figure 2:
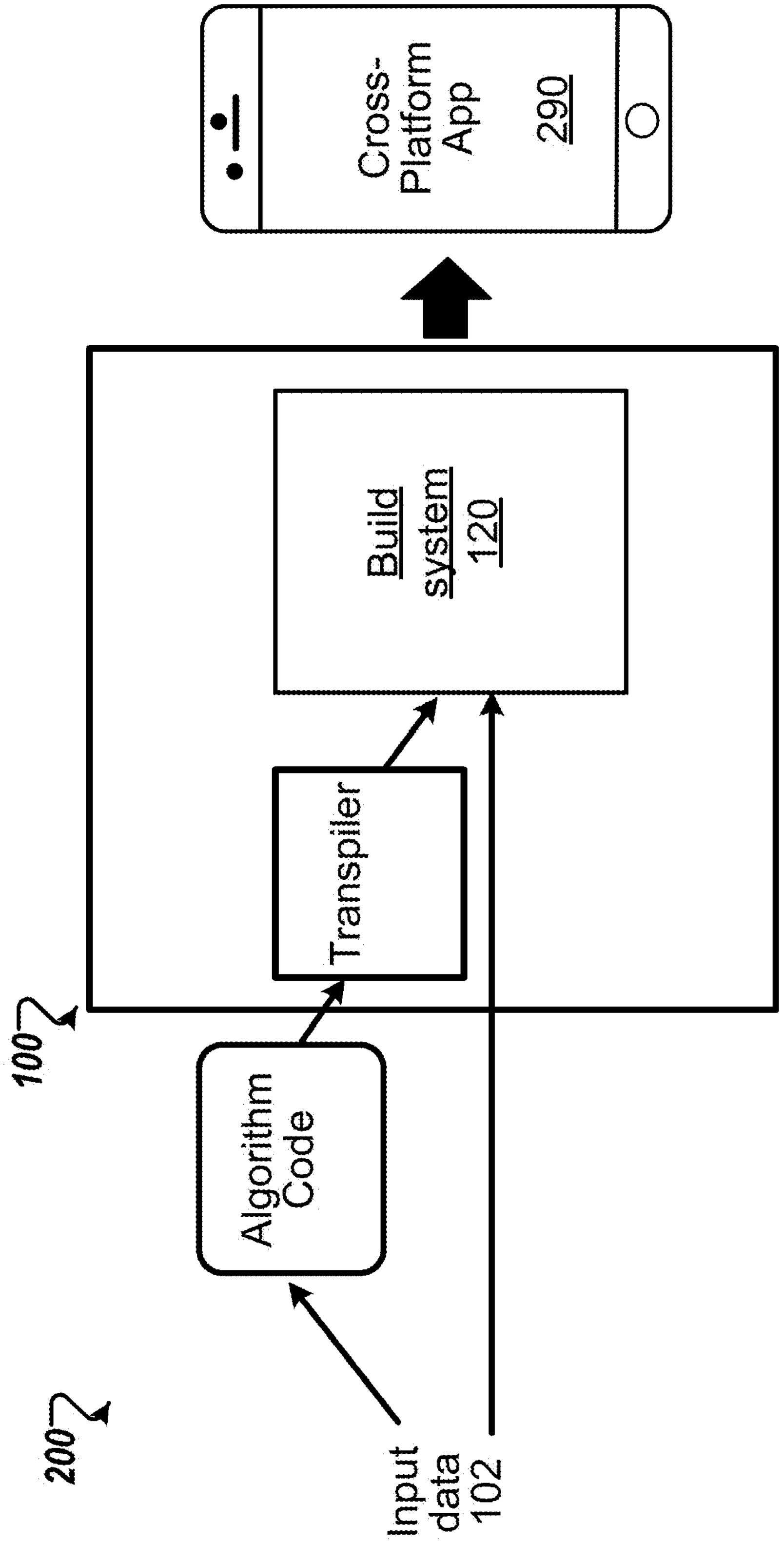
FIG. 2 is a diagram of an example process for generating cross-platform applications.

FIG. 2 is a diagram of an example process 200 for generating cross-platform applications such as the cross-platform application 290. The application generation system 100 receives input data 102. The input data 102 can include algorithm code, or user code, that includes one or more algorithms written in the source language. For example, the source language can be a higher-level programming language such as Python.

The system 100 can provide the algorithm code to the transpiler 110 to generate a set of target language code, such as the set of target language code 112 described above with reference to FIG. 1, to the build system 120. The set of target language code 112 can be a lower-level programming language such as C++.

The build system 120, as described above with reference to FIG. 1, can receive the input data 102 and the set of target language code generated by the transpiler 110 to generate a buildable application. The cross-platform application 290 can be an example of the application 165 generated by the system 100 as described above with reference to FIG. 1.

Figure 3:
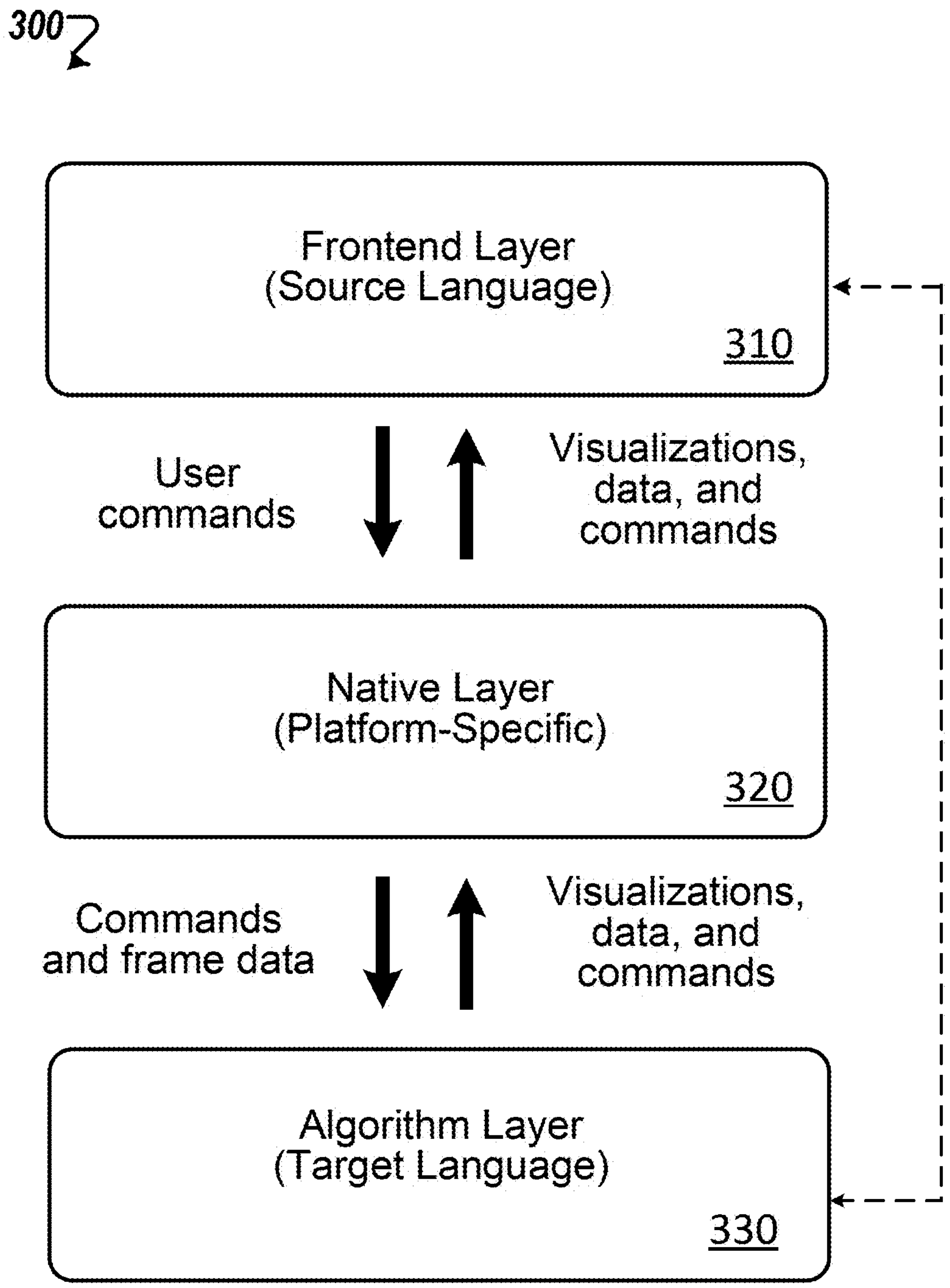
FIG. 3 is a diagram of an example communication stack in a cross-platform application.

FIG. 3 is a diagram of an example communication stack 300 in a cross-platform application. In particular, in this example, the cross-platform application of FIG. 3 is a computer vision application. For example, the computer vision application can interact with native components of the user device on which the application is running. For example, the computer vision application can receive captured data such as videos from the camera and perform computer vision algorithms given the captured data from the camera. Although FIG. 3 describes a computer vision application, the cross-platform application can perform a variety of tasks, for example, language processing tasks, statistical analysis tasks, model training tasks, etc. The system 100 described above can generate the different types of files necessary for the communication stack 300, such as configuration files, build files, object files, and code files.

The communication stack 300 includes a frontend layer 310, a native layer 320, and an algorithm layer 330. Different types of data such as user commands, visualizations, and frame data can be provided to the frontend layer 310, native layer 320, and the algorithm layer 330. Each layer of the communication stack 300 can include a corresponding communication application programming interface (API) that defines how different types of data can be communicated between layers. In some implementations, the different types of data can be communicated between layers executed remotely from each other, as described further below.

For example, the frontend layer 310 can include the user interface of the cross-platform application. The frontend layer 310 can provide a user interface that receives user commands from a user of the application. The frontend layer 310 can provide the user commands to the native layer 320. For example, the user command can include an input to a button to take a video.

The frontend layer 310 can include code files that include interface code. The frontend layer 310 can also include communication APIs that enable communication between the frontend layer 310 and the native layer 320.

The native layer 320 can receive the user commands and process the user commands. For example, the native layer 320 can activate the camera of the user device on which the cross-platform application is running, and receive and store frame data representing the video from the camera. The native layer 320 can provide commands and the frame data to the algorithm layer 330. For example, the commands can include requests to process the frame data, or handling a button press from the frontend layer 310 that may result in a change in a setting or an application state.

The native layer 320 can include platform-specific files and code such as platform configuration files. For example, the native layer 320 can include platform-specific input/output functionality for sensor and filesystem interfaces, for example, in libraries that are generated or linked. The native layer 320 can also include communication APIs that enable communication between the frontend layer 310 and the native layer 320, and the native layer 320 and the algorithm layer 330. In some examples, communication stack functions of the native layer 320 may be purely passthrough. For example, data may pass directly between the frontend layer 310 and the algorithm layer 330.

The algorithm layer 330 can receive the commands and frame data. The algorithm layer 330 can process the frame data according to the algorithms of the target language code. For example, the algorithm layer 330 can perform computer vision operations on the frame data. The algorithm layer 330 can provide the outputs of the computer vision operations, such as visualizations, data, and commands, to the native layer 320. For example, the outputs can include data representing object bounding boxes and/or object identifications. The data can be represented as JSON data, for example.

The algorithm layer can include the set of target language code that can be executed on multiple platforms. The algorithm layer can also include communication API functions or web endpoints for the communication stack, controls for the application state and functionality, and libraries that are required for the algorithms of the set of target language code. The algorithm layer can include compiled binaries, for example, of target language code and libraries.

The native layer 320 can process the visualizations, data, and commands for display on the frontend layer 310. The native layer 320 can provide data representing the visualizations, data, and commands to the frontend layer 310.

The frontend layer 310 can display the data representing the visualizations, data, and commands to the user. For example, the display can include an indication of the object bounding boxes, and/or text that includes the object identifications.

In some examples, the system 100 described above with reference to FIG. 1 may generate all of the code files representing the communication stack 300. These code files include the communication APIs for each layer along with the other functionalities of the layers. Thus, the system 100 can generate all of the code implementing the application based on input data from the user, including code that implements the communication APIs and other files necessary for a buildable application, such as configuration files, build files, object files, and code files.

In some implementations, the frontend layer 310, the native layer 320, and the algorithm layer 330 may execute on computing systems or computing devices remote from each other. In these implementations, the frontend layer 310, the native layer 320, and the algorithm layer 330 can communicate over a communication network such as the Internet. For example, the frontend layer 310 and the native layer 320 may execute on a mobile device, and the algorithm layer 330 may execute on a remote server. The native layer 320 and the algorithm layer 330 can communicate over the Internet.

In some implementations, the frontend layer 310 can communicate directly with the algorithm layer 330. For example, the frontend layer 310 can be implemented as a website. The frontend layer 310 can process user commands and provide data such as commands and frame data to the algorithm layer 330 over the Internet.

In some examples, the frontend layer 310 can be implemented as a website or application on a computer. Implementing the application on a computer may result in more efficient iterative refinement and testing of the application, as building and re-building the application for a computer requires less computing time and resources than building and re-building the application for a mobile device.

In some implementations, the remote server that executes the algorithm layer 330 may execute the algorithm layer 330 for multiple user devices concurrently. For example, the application may be executed on more than one user device. The frontend layer 310 and/or native layer 320 for the application may run on each user device. The remote server executing the algorithm layer 300 may receive data such as commands and frame data from each user device. For each user device, the remote server can process the commands and the frame data for the user device according to the algorithms, and provide the outputs of the algorithms to the user device.

Figure 4:
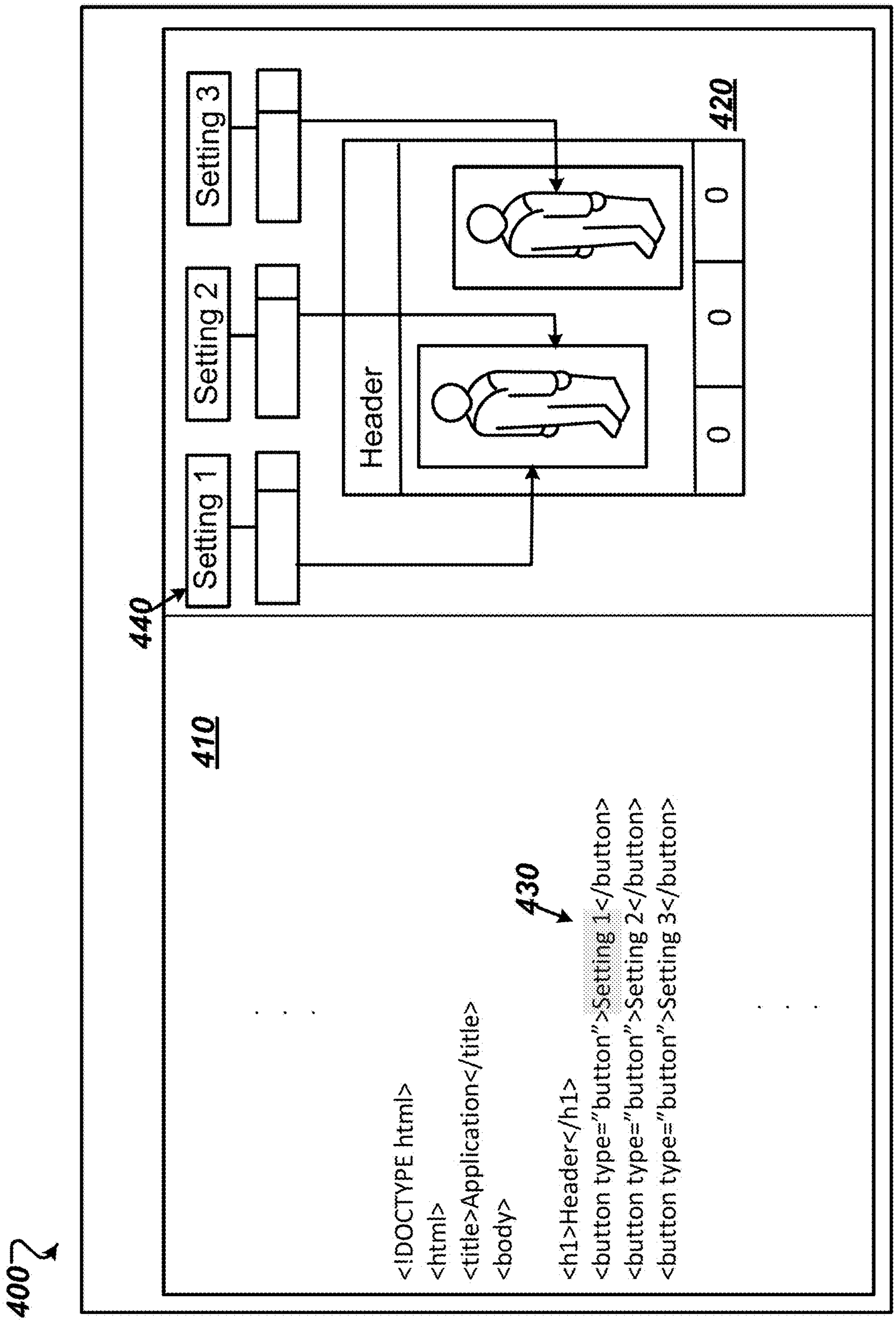
FIG. 4 is a diagram of an example user interface for generating cross-platform applications.

FIG. 4 is a diagram of an example user interface 400 for generating cross-platform applications. A user can interact with system 100 of FIG. 1 using the user interface 400. For example, the user can provide the input data 102 to the system 100 through the user interface 400.

The user interface 400 can be an integrated development environment (IDE), for example. The user interface 400 can include a first portion 410 that allows the user to enter the user code.

The user interface 400 can include a second portion 420 that allows the user to view a preview of the user interface of the cross-platform application. For example, the second portion 420 includes a display of a screen of a simulated user device running the cross-platform application.

In some implementations, the first portion 410 and the second portion 420 can display indications for corresponding sections of the code and user interface components. For example, if the user selects "Setting 1" 440 on the second portion 420, the section of code corresponding to "Setting 1" 430 can be displayed as highlighted in the first portion 410. In some implementations, when the user modifies the user interface components, for example, by adding a user interface component, the system can modify the user code to implement the additional user interface component, and display the modifications in the first portion 410.

In some implementations, when the user modifies the code of the first portion 410, the system can modify the user interface components displayed in the second portion 420 to include the modifications.

In some implementations, the user interface 400 can display indications of markers or flags that can be used for debugging and performance analysis. The user interface 400 can also display indications of potential errors, for example, syntax errors. The user interface 400 can also display suggested fixes for potential errors. The user interface 400 can also display a description of the errors. The user interface 400 can also include one or more menus or other user interface elements, e.g., a popup menu, that displays a more detailed description of the errors. For example, the menu can provide for interaction with a language model or search capacity to learn more about the error.

The user interface 400 can also display indications of suggested changes to the code. For example, the suggested changes may decrease the likelihood of errors or code failure during execution. For example, the suggestions can address sub-optimal programming practices in the code.

As another example, the suggested changes may improve the performance of the code during execution. For example, the suggestions can include alternative code that results in potential performance optimizations for the code.

Figure 5:
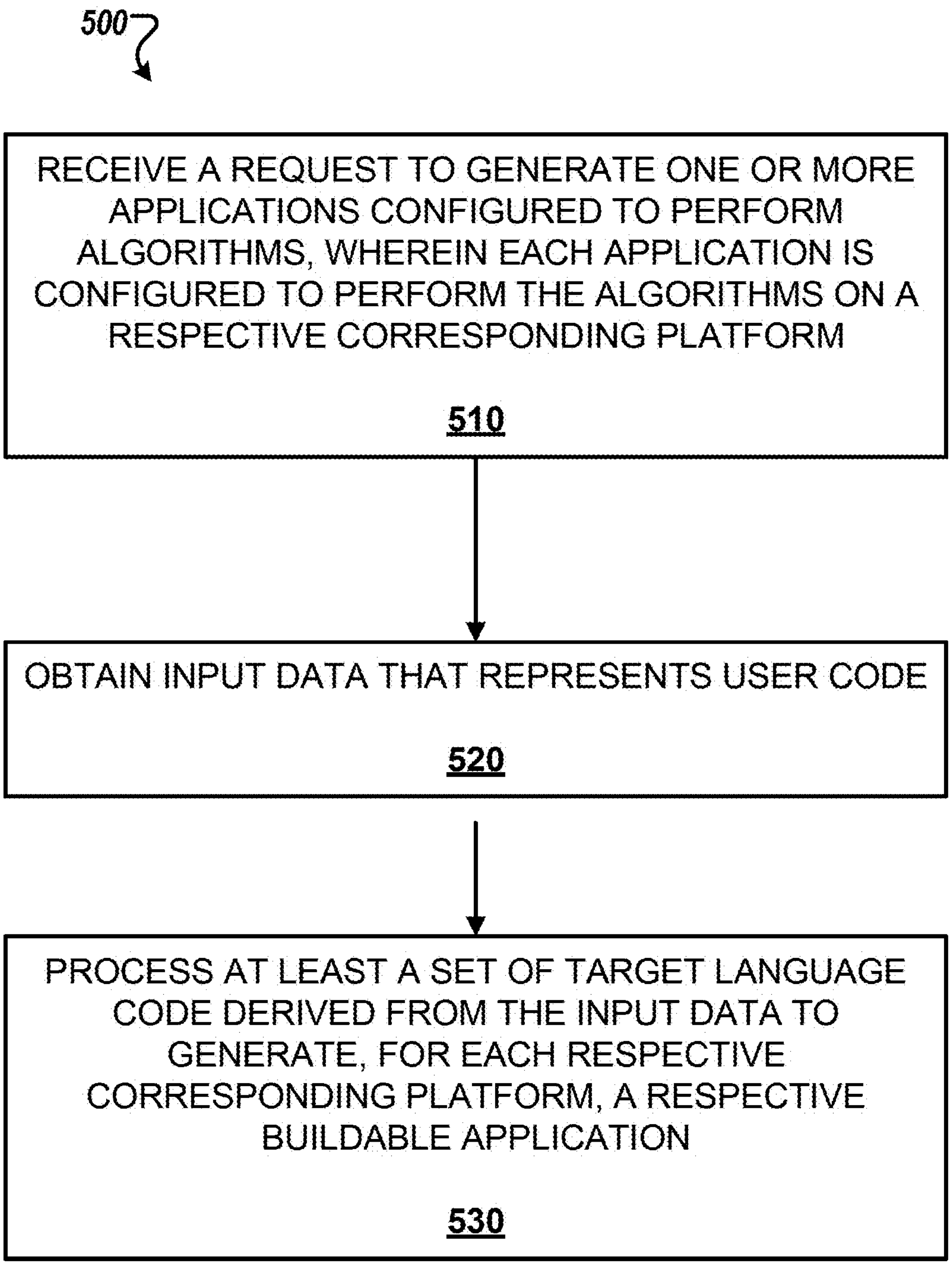
FIG. 5 is a flowchart of an example process for generating cross-platform applications.

FIG. 5 is a flowchart of an example process 500 for generating cross-platform applications. The process 500 can be performed by any appropriate system of one or more computers in one or more locations, e.g., the system 100 of FIG. 1.

The system receives a request to generate one or more applications configured to perform one or more particular algorithms (510). Each of the applications can be configured to perform the algorithms on a respective corresponding platform. Each of the applications, when executed on a respective user device running the respective corresponding platform, can be configured to perform the one or more algorithms based on user inputs to the respective user device. The one or more algorithms can include, for example, machine learning algorithms and/or computer vision algorithms.

In some implementations, each of the applications can be configured to perform at least a portion of the one or more algorithms on one or more devices remote to the respective user device. As an example, files for each application can be organized into a structure that includes multiple layers such as the frontend layer, the native layer, and the algorithm layer. For example, the frontend layer and/or the native layer can be executed on the respective user device. The algorithm layer can be executed on a remote server from the respective user device. As another example, the application can perform algorithms that do not require large amounts of computing time and resources on the user device, and perform more computationally demanding algorithms on the one or more devices remote to the user device.

Each application can be configured to provide data representing commands or user inputs to the respective user device to the one or more devices remote to the respective user device. For example, the frontend layer and/or the native layer can provide data representing commands or user inputs to the algorithm layer over a communication network such as the Internet. The algorithm layer can provide data representing the outputs of the portion of the one or more algorithms to the frontend layer and/or the native layer over the communication network.

In some implementations, the one or more devices remote to the user device may perform at least a portion of the one or more algorithms for multiple user devices.

The system obtains input data that represents user code (520). The user code can include the one or more algorithms. For example, the system can obtain input data from a user. In some implementations, the input data can also include data representing parameters and data representing an interface for the application.

In some implementations, the user code includes a set of source language code. The system can generate a set of target language code from the source language code. For example, the system can use a transpiler as described with reference to FIG. 1 and FIG. 6.

In some implementations, the user code includes a set of target language code.

The system processes at least a set of target language code derived from the input data to generate, for each of the respective corresponding platforms, a respective buildable application (530).

In some implementations, each respective buildable application includes multiple files. Each file can be associated with a corresponding directory of the respective buildable application. In these implementations, the system can process the input data to generate the multiple files. For each of the files, the system can save data representing the file in the corresponding directory of the respective buildable application. The multiple files can be organized into a structure of multiple layers, such as the communication stack 300 described with reference to FIG. 3.

For example, the system can generate one or more configuration files. The configuration files can include, for example, interface configuration files, application configuration files, and/or platform configuration files. The system can generate the one or more configuration files using the configuration template engine 140 described above with reference to FIG. 1. For example, the system can maintain multiple template configuration files, and apply data derived from the input data to one or more of the template configuration files.

The system can also generate one or more build files that include build code for the set of target language code. For example, the system can apply data derived from the input data to templates for the build files.

The system can also generate one or more object files by compiling the set of target language code according to the one or more build files.

The system can also generate one or more code files that include interface code for a user interface of the respective buildable application for the respective corresponding platform. The system can generate the one or more code files using the interface template engine 130 described above with reference to FIG. 1. For example, the user code of the input data may include a set of target language code.

The system can maintain a mapping of subsets of target language code to corresponding templates that include interface code for user interface components. The system can identify one or more subsets within the user code that are similar to a subset of the mapping. The system can generate interface code based on the corresponding templates for the one or more identified subsets.

As another example, the user code of the input data may include a set of source language code. The system can maintain a mapping of subsets of source language code to corresponding templates that include interface code for user interface components. The system can identify one or more subsets within the user code that are similar to a subset of the mapping. The system can generate interface code based on the corresponding templates for the one or more identified subsets. For example, the set of source language code can include a particular sensor modality. The system can identify one or more subsets within the user code that are similar to a subset of the mapping related to the particular sensor modality.

In some implementations, the system can generate interface code based on user input. For example, the system can display multiple user interface components to the user through a user interface such as the user interface 400 of FIG. 4. The system can receive an input from the user that identifies one or more of the displayed user interface components. For example, the input can identify that the user selected a camera user interface component that includes a button to take a picture, a camera user interface component that provides augmented reality (AR) functionality, or a chat user interface component that includes a text entry box. The system can generate interface code based on the corresponding templates for the identified user interface components. For example, the system can generate interface code based on the template for a button that activates the camera, or for a text entry box in a chat.

The system can also generate one or more code files that include debugging code, profiling code, platform code, and/or communication code.

For example, the system can generate debugging code that can be included in the set of target language code. For example, the debugging code, when executed, can printout or log the values of variables, array lengths, function calls, arguments, and information about crashes.

The system can also generate performance profiling code that can be included in the set of target language code. The performance profiling code, when executed, can save data representing the computing time or resources used by the application.

The platform code can implement platform functions for the platform, such as code implementing input and output functionalities. For example, the platform code can include code that implements features for sensors of the user device, code that implements file input and output features, and/or code that implements features for a camera of the user device.

The communication code can implement one or more communication APIs. Each of the communication APIs can be used for communication between layers. For example, a particular communication API can be used for communication between the native layer and the interface layer, and another communication API can be used for communication between the native layer and the algorithm layer.

In some implementations, the system can modify the set of target language code. For example, the system can modify the set of target language code to improve performance of the algorithms. For example, the system can use the acceleration engine 135 described above with reference to FIG. 1. For example, the system can maintain a mapping of subsets of target language code to corresponding templates that each include target language code that is different from the subset of target language code and that, when executed, performs one or more operations of the subset of target language code. The system can identify one or more subsets within the target language code that are similar to a subset of the mapping. The system can modify the one or more subsets within the target language code based on the corresponding templates. In some examples, the corresponding templates can include target language code that, when executed, results in performance improvements over the subsets of target language code.

In some implementations, the system builds each of the respective buildable applications for each of the respective corresponding platforms. For example, the system can use a platform building engine 160 for each platform as described above with reference to FIG. 1.

In some examples, the system can receive data that represents one or more edits to the input data from the user. For example, the user may edit the user code. The system can modify the respective buildable applications according to the one or more edits. The system can generate modified buildable applications efficiently. For example, the system can modify, compile, and build only the files that are relevant to the edits of the user code.

In some examples, the system can use a hot reload host application for iterative development and/or debugging. For example, updated code can be injected into a running application as soon as changes are made, which can speed up the development process. In these examples, the system 100 can include a host application that can dynamically load code modules and state information.

In implementations where the different layers execute remotely on more than one computing system, the hot reload host application can further speed up the development process. For example, when changes are made, potentially only one layer or the layers that are relevant to the changes may need to be updated.

Figure 6:
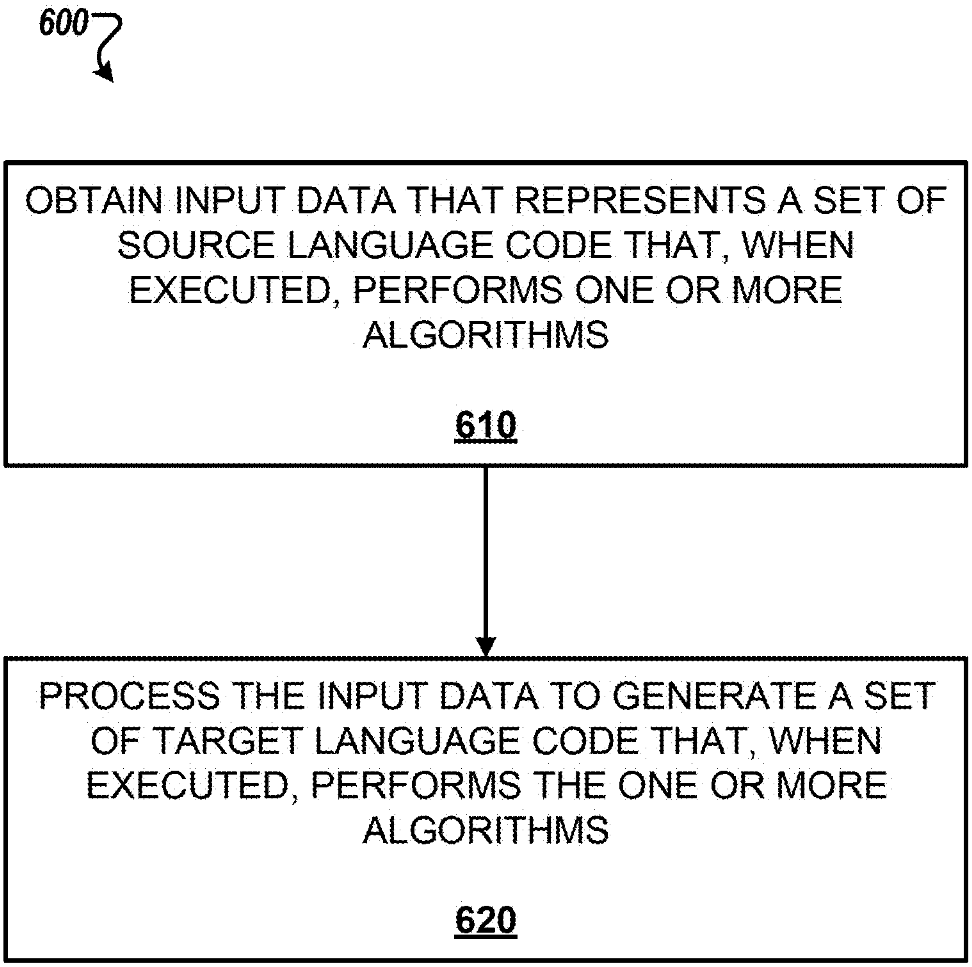
FIG. 6 is a flowchart of an example process for converting source language code to target language code.

FIG. 6 is a flowchart of an example process 600 for converting source language code to target language code. The process 600 can be performed by any appropriate system of one or more computers in one or more locations, e.g., the transpiler 110 of FIG. 1. As an example, the source language can be a higher-level programming language that is more commonly used for machine learning algorithms, such as Python. The target language code can be a lower-level programming language that is more general purpose and can be executed by multiple platforms, such as C++.

The system obtains input data that represents a set of source language code that, when executed, performs one or more algorithms, e.g., machine learning algorithms and/or computer vision algorithms (610). For example, the system can receive the input data from a user or user device.

In some implementations, the set of source language code is type-annotated. For example, the code will include indications of the data type of one or more variables in the code.

In some examples, the code may not include the data type of one or more variables in the code. The system may receive the input data from the user and identify that one or more variables of the set of source language code are not associated with a type. The system can provide data representing the one or more identified variables to the user. The system can receive modifications to the input data from the user. For example, the system can receive an input from the user that represents additions to the code that provide the type for the identified variables.

In some examples, the system may perform type annotation. For example, the system can identify that one or more variables of the set of source language code are not associated with a type and determine a type for each of the one or more variables. For example, the system can determine a type for each of the one or more variables based on the context of the code related to the one or more variables. The system can modify the code with additional code that provides the type for the identified variables. In some implementations, the system can provide data representing the type to the user as a suggested type.

In some implementations, the system can determine a type for each of the one or more variables based on an iterative process. For example, the system can modify the code with additional code that provides a proposed type for each of the one or more variables. The system can use different combinations of proposed types. The system can determine whether the different combinations of proposed types are compatible with the context of the code. In some implementations, the system can execute the code as a program to determine whether the different combinations of proposed types are compatible. For example, the system can Determine whether the proposed types are compatible based on the internal representations of the program.

In some examples, the code may not include portions that are incompatible with conversion. The system may receive the input data from the user and identify that one or more portions of the set of source language code are incompatible for conversion. For example, the system may identify program bugs or patterns which are incompatible with conversion to the target language. The system can provide data representing the one or more identified portions to the user. The system can receive modifications to the input data from the user. For example, the system can receive an input from the user that represents additions or modifications to the portions that make the portions compatible with conversion to the target language.

In some examples, the system can determine modifications to the identified portions that may address the incompatibilities. The system can provide data representing the modifications to the user as suggested modifications.

In some implementations, the system can provide data representing one or more identified variables, suggested type annotations for the one or more identified variables, identified portions, and/or suggested modifications to the identified portions to the user through a user interface. For example, the system can provide the data to the user through the IDE shown in FIG. 4. The system can also provide the data through a command-line user interface.

In some implementations, the system can provide interactive functionalities for modifying the set of source language code. For example, the system can generate and provide suggestions to the user. For example, the system can provide type suggestions for variables that are not associated with a type. The system can further provide an interactive window that allows the user to iteratively refactor the code to address the suggestions provided by the system. The system can provide for refactoring with context and scope aware modeling. For example, the system can provide a search and replace functionality, and/or allow the user to refactor the code using natural language commands. For example, the system can receive an input from the user that identifies a variable name change, such as "change variable 'x' to 'y.'" The system can provide the input and the set of source language code to a large language model. The system can receive a modified set of source language code from the large language model and provide the modified set of source language code for presentation to the user.

The system can also allow the user to automatically accept any suggestions or proposed changes generated by the system. The system can also include comments or metadata that record data representing changes that have been made by the system or by the user. The system can allow the user to modify or undo these changes.

The system processes the input data to generate a set of target language code that, when executed, performs the one or more algorithms, e.g., one or more machine learning algorithms and/or computer vision algorithms (620). For example, the system can generate a first syntax tree based on the set of source language code. The first syntax tree can be associated with the source language code. As an example, the first syntax tree can be a concrete syntax tree (CST) or an abstract syntax tree (AST). The system can generate a second syntax tree based on the first syntax tree. The second syntax tree can be associated with the target language code. The second syntax tree can be a CST or an AST, for example. The system can process the second syntax tree to generate the set of target language code. For example, the system can serialize the second syntax tree to generate the set of target language code.

In some implementations, the system can also generate an intermediate syntax tree. For example, the system can generate a first syntax tree based on the set of source language code. The first syntax tree can be associated with the source language code. The system can generate an intermediate syntax tree based on the first syntax tree. For example, the system can generate the intermediate syntax tree by traversing the first syntax tree. The intermediate syntax tree can serve as a mapping between the source language code and the target language code. For example, the intermediate syntax tree can include portions that correspond to blocks of code that are semantically relevant for conversion, allowing the system to preserve the style of the set of source language code during conversion. In addition, in some examples, the structure of the set of target language code may be different than the set of source language code. For example, converting a single line of Python code may require multiple lines of C++ code. The system can use the intermediate syntax tree to represent the change in structure while representing the mapping between the source language code and the target language code. The system can generate a second syntax tree based on the intermediate syntax tree. The second syntax tree can be associated with the target language code. The system can process the second syntax tree to generate the set of target language code. For example, the system can serialize the second syntax tree to generate the set of target language code.

In some implementations where the system generates an intermediate syntax tree, the system can modify the intermediate syntax tree. For example, the system can maintain a mapping of portions of an intermediate syntax tree to corresponding portions that include a portion that is different from the portion of the intermediate syntax tree, and that, when executed, performs one or more operations of the portion of the intermediate syntax tree. For example, the corresponding portion, when converted into the set of target language code, may be a different set of target language code than the portion of the unmodified intermediate syntax tree, but performs the same operations. In some examples, the corresponding portion can result in performance optimizations or improvements to timing. The system can identify one or more portions within the generated intermediate syntax tree that are similar to a portion of the mapping. For example, the system can identify that the structure of the one or more portions within the generated intermediate syntax tree is similar to the structure of one or more of the portions of the mapping. The system can then modify the one or more identified portions within the generated intermediate syntax tree based on the corresponding portions. For example, the system can replace each of the one or more identified portions within the generated intermediate syntax tree with the corresponding portion.

As an example, the portion of the mapping can correspond to a parallelizable section of the source language code. For example, the portion of the mapping can correspond to a loop or array operation. The portion of the mapping can include a portion of an intermediate syntax tree that, when converted to the target language code, results in parallelization of the operations of the source language code.

In some examples, the size of an array may not be defined until runtime. In some of these examples, parallelization may not lead to performance improvements unless the array is of sufficient size. The portion of the mapping can include a portion of an intermediate syntax tree that, when converted to the target language code, includes a runtime size check and different sections of code for different levels of parallelization depending on the runtime size.

As another example, the portion of the mapping can correspond to neural network operations of the source language code. The portion of the mapping can include a portion of an intermediate syntax tree that, when converted to the target language code, results in methods that accelerate neural network operations such as quantization, pruning, model compiling, model distillation, pipelining, etc.

As another example, the portion of the mapping can include a portion of an intermediate syntax tree that, when converted to the target language code, includes code that benchmarks the use of different types of computing hardware, and saves data representing the performance of different types of hardware when executing the set of target language code in a database of performance statistics. For example, the system can store data representing the performance in the memory 145 of FIG. 1. The system can generate intermediate syntax trees based on the data representing the performance of different types of hardware.

In some implementations, the system can modify the intermediate syntax tree based on different methods or libraries for different devices to maximize performance on each device. For example, the system can maintain mappings of portions of intermediate syntax trees for different devices, such that when the intermediate syntax tree is converted to the target language code, it includes methods or uses libraries specific to each device. The system can continually update the mappings based on the performance of the target language code on different types of hardware, as described above.

In some implementations, the system can process the input data to generate a set of target language code by processing the set of source language code using a machine learning model. For example, the machine learning model can be configured to generate target language code given source language code. The machine learning model can have been trained on multiple training examples that each include a training set of source language code and a ground-truth set of target language code. The ground-truth set of target language code is a set of target language code that, when executed, performs the same operations as the training set of source language code.

In some implementations, the machine learning model can be configured to generate a second syntax tree associated with the target language code given a first syntax tree associated with the source language code. For example, the system can generate a first syntax tree based on the set of source language code. The system can provide the generated first syntax tree to the machine learning model to generate a second syntax tree. The system can serialize the generated second syntax tree to generate the set of target language code. The machine learning model can have been trained on multiple training examples that each include a training first syntax tree and a ground-truth second syntax tree that corresponds to the training first syntax tree.

In some implementations, the system can process the input data to generate a set of target language code by executing the set of source language code as a program. The system can maintain, at each of multiple time steps, a respective representation of the internal state of the program. For each time step, the system can determine a subset of target language code that results in the respective representation for the time step. The system can include the determined subset of target language code in the set of target language code.

In these implementations, the system can override conditional expressions in the set of source language code, in order to explore all conditional branches of the code. The system can also include the contents of comments in the set of source language code in the set of target language code.

In some implementations, after generating the set of target language code, the system can execute the set of target language code as a program. The system can identify any compile and runtime errors in the set of target language code, and trace the errors to the set of source language code. The system can provide data representing the errors to the user through the user interface, and/or make suggestions for modifying the set of user language code, as described above.

In some implementations, the system can identify one or more sections within the set of target language code that can be modified using a large language model. For example, the system can use a large language model to identify sections of the set of target language code that can be modified. For example, the system can provide the set of target language code as input to a large language model to generate an output identifying sections of the set of target language code that can be modified. In response to identifying sections of the set of target language code that can be modified, the system can provide a prompt to the large language model to generate sections of the target language code that, when executed, result in performance improvements compared to the existing section of target language code.

In these implementations, the system can execute both the existing sections of target language code and the modified sections of the target language code using a test suite of inputs. The system can compare the outputs of the execution of the existing sections and the modified sections. The system can determine whether the modified section is interchangeable with the existing section based on any differences in the outputs. For example, in response to determining that the outputs are different, the system can determine to not replace the existing sections with the modified sections. In response to determining that the outputs are equivalent, the system can replace the existing sections with the modified sections.

In some implementations, processing the input data to generate a set of target language code further includes generating debugging and/or performance profiling code to include in the set of target language code. For example, after generating the set of target language code from the set of source language code, the system can modify the set of target language code to include debugging and/or performance profiling code.

Figure 7:
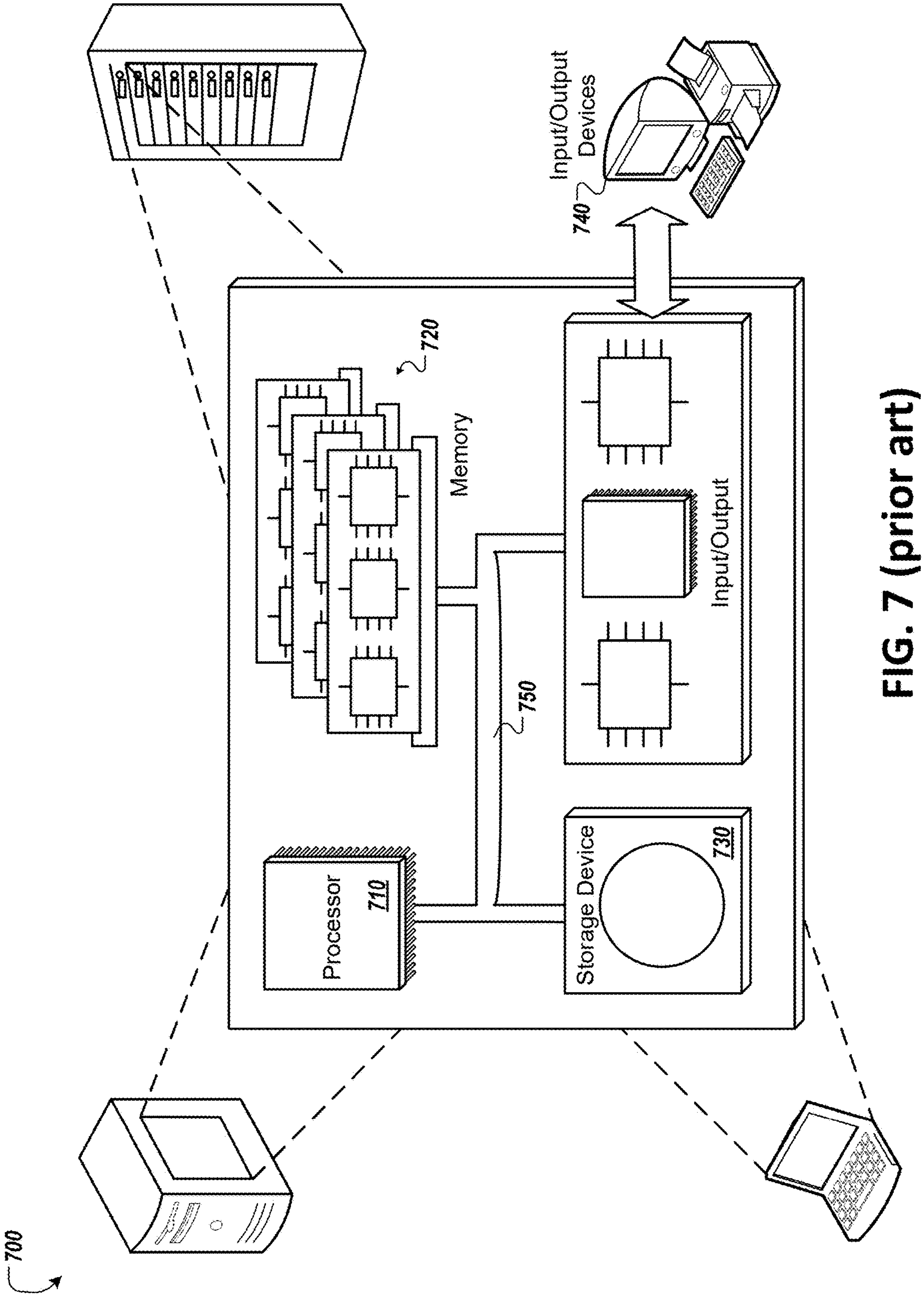
FIG. 7 (prior art)
FIG. 7 depicts a schematic diagram of a computer system that may be applied to any of the computer-implemented methods and other techniques described in this specification.

FIG. 7 depicts a schematic diagram of a computer system that may be applied to any of the computer-implemented methods and other techniques described herein. The system 700 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 700) and their structural equivalents, or in combinations of one or more of them. The system 700 is intended to include various forms of digital computers, such as laptops, desktops, workstations, personal digital assistants, servers, blade servers, mainframes, and other appropriate computers, including vehicles installed on base units or pod units of modular vehicles. The system 700 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transducer or USB connector that may be inserted into a USB port of another computing device.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a solid-state device (SSD), a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term “data processing apparatus” refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

receiving a request to generate one or more applications configured to perform one or more algorithms, wherein each of the one or more applications is configured to perform the one or more algorithms on a respective corresponding platform of a plurality of platforms, and wherein each application, when executed on a respective user device running the respective corresponding platform, is configured to perform the one or more algorithms based on user inputs to the respective user device;

obtaining input data that represents user code that comprises the one or more algorithms; and processing at least a set of target language code derived from the input data to generate, for each of the respective corresponding platforms, a respective buildable application.

Embodiment 2 is the method of embodiment 1, wherein the method further comprises:

building, for each of the respective corresponding platforms, the respective buildable application.

Embodiment 3 is the method of any of embodiments 1-2, wherein obtaining input data comprises receiving input data from a user.

Embodiment 4 is the method of embodiment 3, wherein the input data comprises one or more of data representing parameters, and data representing an interface for the one or more applications.

Embodiment 5 is the method of any of embodiments 1-4, wherein the one or more algorithms comprise one or more machine learning algorithms.

Embodiment 6 is the method of any of embodiments 1-5, wherein the one or more algorithms comprise one or more computer vision algorithms.

Embodiment 7 is the method of any of embodiments 1-6, wherein the user code comprises a set of source language code, and wherein the method further comprises generating a set of target language code from the source language code.

Embodiment 8 is the method of any of embodiments 1-7, wherein the user code comprises a set of target language code.

Embodiment 9 is the method of any of embodiments 1-8, wherein each application is configured to perform at least a portion of the one or more algorithms on one or more devices remote to the respective user device.

Embodiment 10 is the method of embodiment 9, wherein each application is configured to provide data representing commands or user inputs to the respective user device to the one or more devices.

Embodiment 11 is the method of any of embodiments 1-10, wherein each respective buildable application comprises a plurality of files, each associated with a corresponding directory of the respective buildable application, and processing the input data comprises:

generating the plurality of files, comprising:

generating one or more configuration files;

generating one or more build files comprising build code for the set of target language code;

generating one or more object files by compiling the set of target language code according to the one or more build files;

generating one or more code files comprising one or more of: interface code for a user interface of the respective buildable application for the respective corresponding platform, debugging code, profiling code, platform code, and communication code; and for each of the plurality of files, saving data representing the file in the corresponding directory of the respective buildable application.

Embodiment 12 is the method of embodiment 11, wherein the plurality of files are organized into a structure comprising multiple layers.

Embodiment 13 is the method of embodiment 12, wherein the communication code implements one or more communication application programming interfaces (APIs) between the multiple layers.

Embodiment 14 is the method of any of embodiments 12-13, wherein each application is configured to perform at least a portion of at least one of the multiple layers on one or more devices remote to the respective user device.

Embodiment 15 is the method of any of embodiments 11-14, wherein the one or more configuration files comprise any one of: interface configuration files, application configuration files, or platform configuration files.

Embodiment 16 is the method of any of embodiments 11-15, wherein generating the one or more configuration files comprises:

maintaining a plurality of template configuration files; and applying data derived from the input data to one or more of the plurality of template configuration files.

Embodiment 17 is the method of any of embodiments 11-16, wherein the user code comprises a set of target language code, and wherein generating one or more code files comprises:

maintaining a mapping of subsets of target language code to corresponding templates comprising interface code for user interface components;

identifying one or more subsets within the user code that are similar to a subset of the mapping; and generating interface code based on the corresponding templates for the one or more identified subsets.

Embodiment 18 is the method of any of embodiments 11-17, wherein the user code comprises a set of source language code, and wherein generating one or more code files comprises:

maintaining a mapping of subsets of source language code to corresponding templates comprising interface code for user interface components;

identifying one or more subsets within the user code that are similar to a subset of the mapping; and generating interface code based on the corresponding templates for the one or more identified subsets.

Embodiment 19 is the method of any of embodiments 11-18, wherein generating one or more code files comprises:

displaying a plurality of user interface components to a user, wherein each user interface component has a corresponding template comprising user interface code;

receiving an input from the user that identifies one or more of the plurality of user interface components; and generating interface code based on the corresponding templates for the identified user interface components.

Embodiment 20 is the method of any of embodiments 11-19, further comprising:

modifying the set of target language code, comprising:

maintaining a mapping of subsets of target language code to corresponding templates each comprising target language code that is different from the subset of target language code and that, when executed, performs one or more operations of the subset of target language code;

identifying one or more subsets within the set of target language code that are similar to a subset of the mapping; and modifying the one or more subsets within the set of target language code based on the corresponding templates.

Embodiment 21 is the method of any of embodiments 1-20, further comprising:

receiving data that represents one or more edits to the input data from a user; and modifying the respective buildable applications according to the one or more edits.

Embodiment 22 is a system comprising: one or more computers and one or more storage devices storing instructions that are operable, when executed by the one or more computers, to cause the one or more computers to perform the method of any one of embodiments 1 to 21.

Embodiment 23 is one or more computer-readable storage media storing instructions that when executed by one or more computers cause the one or more computers to perform the methods of any one of embodiments 1 to 21.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:

receiving a request to generate one or more applications configured to perform one or more algorithms, wherein each of the one or more applications is configured to perform the one or more algorithms on a respective corresponding platform of a plurality of platforms, and wherein each application, when executed on a respective user device running the respective corresponding platform, is configured to perform the one or more algorithms based on user inputs to the respective user device;

obtaining input data that represents user code that comprises the one or more algorithms in a programming language;

obtaining a set of target language code that comprises the one or more algorithms, and wherein the set of target language code is derived from the input data; and processing at least the set of target language code to generate, for each of the respective corresponding platforms, a respective buildable application, comprising:

maintaining a plurality of template files, wherein each template file comprises a template of a file for building the respective buildable application, wherein the plurality of template files comprises a plurality of template configuration files, and wherein each template configuration file comprises a template of a configuration file that is required by a respective build system for the respective corresponding platform to build the respective buildable application for the respective corresponding platform; and applying data derived from the input data to one or more of the plurality of template files to generate one or more files for building the respective buildable application, comprising:

applying data derived from at least the set of target language code to one or more of the plurality of template configuration files to generate one or more configuration files that are required by the respective build system for the respective corresponding platform to build the respective buildable application for the respective corresponding platform, wherein the respective buildable application comprises a user interface defined by interface code, and wherein the interface code is modifiable based on a mapping of subsets of target language code to corresponding templates that each comprise interface code for a respective user interface component of the user interface.

2. The method of claim 1, wherein the method further comprises:

building, for each of the respective corresponding platforms, the respective buildable application.

3. The method of claim 1, wherein obtaining input data comprises receiving input data from a user.

4. The method of claim 3, wherein the input data comprises one or more of data representing parameters, and data representing an interface for the one or more applications.

5. The method of claim 1, wherein the one or more algorithms comprise one or more machine learning algorithms.

6. The method of claim 1, wherein the one or more algorithms comprise one or more computer vision algorithms.

7. The method of claim 1, wherein the user code comprises a set of source language code in the programming language, and wherein obtaining a set of target language code comprises generating the set of target language code in a second programming language from the source language code, and wherein each application, when executed on a respective user device running the respective corresponding platform, is configured to perform the one or more algorithms in the second programming language based on user inputs to the respective user device.

8. The method of claim 7, wherein the user code comprises a set of target language code, and wherein the programming language and the second programming language are a same programming language.

9. The method of claim 1, wherein each application is configured to perform at least a portion of the one or more algorithms on one or more devices remote to the respective user device.

10. The method of claim 9, wherein each application is configured to provide data representing commands or user inputs to the respective user device to the one or more devices.

11. The method of claim 1, wherein each respective buildable application comprises a plurality of files that comprises the one or more files, each associated with a corresponding directory of the respective buildable application, wherein the one or more files comprise one or more of: interface code, debugging code, profiling code, platform code, or communication code, and wherein processing at least the set of target language code to generate, for each of the respective corresponding platforms, a respective buildable application comprises:

generating the plurality of files, comprising:

generating one or more configuration files;

generating one or more build files comprising build code for the set of target language code;

generating one or more object files by compiling the set of target language code according to the one or more build files; and for each of the plurality of files, saving data representing the file in the corresponding directory of the respective buildable application.

12. The method of claim 11, wherein the plurality of files are organized into a structure comprising multiple layers.

13. The method of claim 12, wherein the communication code implements one or more communication application programming interfaces (APIs) between the multiple layers.

14. The method of claim 12, wherein each application is configured to perform at least a portion of at least one of the multiple layers on one or more devices remote to the respective user device.

15. The method of claim 11, wherein the one or more configuration files comprise any one of: interface configuration files, application configuration files, or platform configuration files.

16. The method of claim 11, wherein the user code comprises a set of target language code, and wherein one or more of the files comprises interface code, further comprising generating the interface code by:

maintaining a mapping of subsets of target language code to corresponding templates comprising the interface code for one or more respective user interface components;

identifying one or more subsets within the user code that are similar to a subset of the mapping; and generating the interface code based on the corresponding templates for the one or more identified subsets.

17. The method of claim 11, wherein the user code comprises a set of source language code, and wherein one or more of the files comprises the interface code, further comprising generating the interface code by:

maintaining a mapping of subsets of source language code to corresponding templates comprising the interface code for one or more respective user interface components;

identifying one or more subsets within the user code that are similar to a subset of the mapping; and generating the interface code based on the corresponding templates for the one or more identified subsets.

18. The method of claim 11, wherein one or more of the code files comprises interface code, further comprising generating the interface code by:

displaying a plurality of user interface components to a user, wherein each user interface component has a corresponding template comprising user interface code;

receiving an input from the user that identifies one or more of the plurality of user interface components; and generating the interface code based on the corresponding templates for the identified user interface components.

19. The method of claim 11, further comprising:

modifying the set of target language code, comprising:

maintaining a mapping of subsets of target language code to corresponding templates each comprising target language code that is different from the subset of target language code and that, when executed, performs one or more operations of the subset of target language code;

identifying one or more subsets within the set of target language code that are similar to a subset of the mapping; and modifying the one or more subsets within the set of target language code based on the corresponding templates.

20. The method of claim 1, further comprising:

receiving data that represents one or more edits to the input data from a user; and modifying the respective buildable applications according to the one or more edits.

21. A system comprising:

one or more computers; and one or more storage devices storing instructions that, when executed by the one or more computers, cause the one or more computers to perform operations comprising:

receiving a request to generate one or more applications configured to perform one or more algorithms, wherein each of the one or more applications is configured to perform the one or more algorithms on a respective corresponding platform of a plurality of platforms, and wherein each application, when executed on a respective user device running the respective corresponding platform, is configured to perform the one or more algorithms based on user inputs to the respective user device;

obtaining input data that represents user code that comprises the one or more algorithms in a programming language;

obtaining a set of target language code that comprises the one or more algorithms, and wherein the set of target language code is derived from the input data; and processing at least the set of target language code to generate, for each of the respective corresponding platforms, a respective buildable application, comprising:

maintaining a plurality of template files, wherein each template file comprises a template of a file for building the respective buildable application, wherein the plurality of template files comprises a plurality of template configuration files, and wherein each template configuration file comprises a template of a configuration file that is required by a respective build system for the respective corresponding platform to build the respective buildable application for the respective corresponding platform; and applying data derived from the input data to one or more of the plurality of template files to generate one or more files for building the respective buildable application, comprising:

applying data derived from at least the set of target language code to one or more of the plurality of template configuration files to generate one or more configuration files that are required by the respective build system for the respective corresponding platform to build the respective buildable application for the respective corresponding platform, wherein the respective buildable application comprises a user interface defined by interface code, and wherein the interface code is modifiable based on a mapping of subsets of target language code to corresponding templates that each comprise interface code for a respective user interface component of the user interface.

22. One or more computer-readable storage media storing instructions that when executed by one or more computers cause the one or more computers to perform operations comprising:

receiving a request to generate one or more applications configured to perform one or more algorithms, wherein each of the one or more applications is configured to perform the one or more algorithms on a respective corresponding platform of a plurality of platforms, and wherein each application, when executed on a respective user device running the respective corresponding platform, is configured to perform the one or more algorithms based on user inputs to the respective user device;

obtaining input data that represents user code that comprises the one or more algorithms in a programming language;

obtaining a set of target language code that comprises the one or more algorithms, and wherein the set of target language code is derived from the input data; and processing at least the set of target language code to generate, for each of the respective corresponding platforms, a respective buildable application, comprising:

maintaining a plurality of template files, wherein each template file comprises a template of a file for building the respective buildable application, wherein the plurality of template files comprises a plurality of template configuration files, and wherein each template configuration file comprises a template of a configuration file that is required by a respective build system for the respective corresponding platform to build the respective buildable application for the respective corresponding platform; and applying data derived from the input data to one or more of the plurality of template files to generate one or more files for building the respective buildable application, comprising:

applying data derived from at least the set of target language code to one or more of the plurality of template configuration files to generate one or more configuration files that are required by the respective build system for the respective corresponding platform to build the respective buildable application for the respective corresponding platform, wherein the respective buildable application comprises a user interface defined by interface code, and wherein the interface code is modifiable based on a mapping of subsets of target language code to corresponding templates that each comprise interface code for a respective user interface component of the user interface.

* * * * *